(12) United States Patent
Tang-Schomer

(10) Patent No.: US 12,435,316 B2
(45) Date of Patent: Oct. 7, 2025

(54) THREE DIMENSIONAL HUMAN BRAIN TUMOR MODELS

(71) Applicant: Min Tang-Schomer, Marlborough, CT (US)

(72) Inventor: Min Tang-Schomer, Marlborough, CT (US)

( * ) Notice: Subject to any disclaimer, the term of this patent is extended or adjusted under 35 U.S.C. 154(b) by 496 days.

(21) Appl. No.: 17/241,708

(22) Filed: Apr. 27, 2021

(65) Prior Publication Data

US 2021/0317417 A1  Oct. 14, 2021

Related U.S. Application Data

(63) Continuation of application No. PCT/US2019/058318, filed on Oct. 28, 2019.

(60) Provisional application No. 62/751,772, filed on Oct. 29, 2018.

(51) Int. Cl.
C12N 5/071 (2010.01)
C12N 5/079 (2010.01)

(52) U.S. Cl.
CPC ......... *C12N 5/0697* (2013.01); *C12N 5/0618* (2013.01); *C12N 2533/90* (2013.01)

(58) Field of Classification Search
CPC ............................ C12N 5/0697; C12N 5/0618; C12N 2533/90; C12N 2501/11; C12N 2501/115; C12N 2503/02; C12N 2513/00; C12N 2533/54; C12N 2533/80; C12N 5/069; C12N 5/0693; G01N 33/5011; G01N 33/5088; C12M 25/14
See application file for complete search history.

(56) References Cited

U.S. PATENT DOCUMENTS

2019/0194604 A1  6/2019  Tang-Schomer

FOREIGN PATENT DOCUMENTS

| WO | 2015017626 A1 | 2/2015 | | |
|----|----|----|----|----|
| WO | 2018013542 A1 | 1/2018 | | |
| WO | WO-2018013612 A1 | * | 1/2018 | ............. A61K 35/30 |
| WO | WO-2018127850 A1 | * | 7/2018 | ............. B33Y 10/00 |

OTHER PUBLICATIONS

Irie et al.; Distinct roles of Akt1 and Akt2 in regulating cell migration and epithelial-mesenchymal transition; The Journal of Cell Biology, vol. 171, No. 6, Dec. 19, 2005 1023-1034 (Year: 2005).*

Indolfi, Laura, Aaron B. Baker, and Elazer R. Edelman. "The Role of Scaffold Microarchitecture in Engineering Endothelial Cell Immunomodulation." Biomaterials 33, No. 29 (Oct. 2012): 7019-7027. (Year: 2012).*

Mazzocchi, A.R., Rajan, S.A.P., Votanopoulos, K.I. et al. In vitro patient-derived 3D mesothelioma tumor organoids facilitate patient-centric therapeutic screening. Sci Rep 8, 2886 (2018). https://doi.org/10.1038/s41598-018-21200-8 (Year: 2018).*

Cox, J. et al.; "MaxQuant enables high peptide identification rates, individualized p. p.b.-range mass accuracies and proteome-wide protein quantification"; Nature Biotechnology, vol. 26, Issue No. 12; 2008; pp. 1367-1372; DOI: 10.1038/nbt.1511.

International Search Report and Written Opinion for International Application PCT/US2019/058318; International Filing Date: Oct. 28, 2019; Date of Mailing: Jan. 22, 2020; 8 pages.

Kilday, J-P. et al.; "Chemotherapy in Childhood Brain Tumors"; Current Pedatrics Reports, vol. 2, Issue No. 1; 2014; pp. 38-49.

Li, B. et al.; "RSEM: accurate transcript quantification from RNA-Seq data with or without a reference genome"; BMC Bioinformatics, vol. 12; 2011; pp. 323 and 2105-2012; DOI: 10.1186/1471-2105-12-323.

Nageswara Rao, A. et al.; "Biologically targeted therapeutics in pediatric brain tumors"; Pediatric Neurology, vol. 46, Issue No. 4; 2012; pp. 203-211.

Ritchie, M. et al.; "Limma powers differential expression analyses for RNA-sequencing and microarray studies"; Nucleic Acids Research, vol. 43, Issue No. 7; 2015; p. e47; DOI: 10.1093/nar/gkv007.

Robinson, M. et al.; "edgeR: a Bioconductor package for differential expression analysis of digital gene expression data"; Bioinformatics, vol. 26, Issue No. 1; 2010; pp. 139-140; DOI: 10.1093/bioinformatics/btp616.

Tang-Schomer, et al.; "Bioengineered functional brain-like cortical tissue"; PNAS, vol. 111, Issue No. 38; 2014; pp. 13811-13816.

Azzarelli, R. et al. The developmental origin of brain tumours: a cellular and molecular framework, Development (2018) 145, dev162693. doi:10.1242/dev.162693.

Clark, Michael James, et al. U87MG Decoded: The Genomic Sequence of a Cytogenetically Aberrant Human Cancer Cell Line, PLoS Genet (2009) 6(1): e1000832. doi:10.1371/journal.pgen.1000832.

Li, Aiguo, et al. Genomic Changes and Gene Expression Profiles Reveal That Established Glioma Cell Lines Are Poorly Representative of Primary HumanGliomas, Mol Cancer Res 2008;6(1). Jan. 2008.

(Continued)

*Primary Examiner* — Fereydoun G Sajjadi
*Assistant Examiner* — Masudur Rahman
(74) *Attorney, Agent, or Firm* — Karen A. LeCuyer; DeWitt LLP

(57) ABSTRACT

Provided herein is a personalized in vitro brain tumor model including a culture medium and patient tumor cells, wherein a brain tumor tissue sample is extracted directly from the patient. dissociated, and the patient tumor cells from the brain tumor tissue sample seeded directly onto a three-dimensional solid scaffold in the absence of extracellular matrix or endothelial cells to provide tumor growth on the scaffold. The three-dimensional solid scaffold includes a biocompatible and/or biodegradable material, wherein the three-dimensional solid scaffold and directly seeded patient tumor cells are optionally coated with extracellular matrix and/or endothelial cells.

14 Claims, 8 Drawing Sheets

(56) References Cited

OTHER PUBLICATIONS

Tang-Schomer, Min R., et al. 3D patient-derived tumor models to recapitulate pediatric brain tumors In Vitro, Translational Oncology 20 (2022) 101407.

Tang-Schomer, Min R., et al. Human Patient-Derived Brain Tumor Models to Recapitulate Ependymoma Tumor Vasculature, Bioengineering 2023, 10, 840. https://doi.org/10.3390/bioengineering10070840.

Amani V et al., Characterization of 2 Novel Ependymoma Cell Lines With Chromosome 1q Gain Derived From Posterior Fossa Tumors of Childhood, J. Neuropathol. Exp. Neurol., vol. 76(7) 2017 595-604.

Ozbek et al. Applications of 3D Bioprinting Technology to Brain Cells and Brain Tumor Models: Special Emphasis to Glioblastoma, ACS Biomaterials Science & Engineering 2024, 10, 2616-2635.

Sood et al. 3D extracellular matrix microenvironment in bioengineered tissue models of pediatric and adult brain tumors:, Nature Communications (2019) 10:4529.

Sood et al. 3D extracellular matrix microenvironment in bioengineered tissue models of pediatric and adult brain tumors:, Nature Communications (2019) 10:4529. Supplementary Information.

Li et al. Genomic changes and gene expression profiles reveal that established glioma cell lines are poorly representative of primary human gliomas, Mol Cancer Res. Jan. 2008;6(1):21-30. doi: 10.1158/1541-7786.MCR-07-0280. Epub Jan. 9, 2008. PMID: 18184972.

Dawson et al. In vivo loss of tumorigenicity in a patient-derived orthotopic xenograft mouse model of ependymoma, Cell Death Differ. Jan. 1996;3(1):71-8. PMID: 17180057.

\* cited by examiner

THREE DIMENSIONAL HUMAN BRAIN TUMOR MODELS

RELATED APPLICATIONS

This application is a continuation of international application number PCT/US2019/058318, filed Oct. 28, 2019, which claims the benefit under 35 U.S.C. § 119(e) of U.S. provisional application number 62/751,772, filed Oct. 29, 2018, which is incorporated by reference herein in its entirety.

BACKGROUND

The advancement of three dimensional (3D) tissue engineering provides new avenues for developing human brain tissue models. A 3D architecture enables important interactions among cells, and between cells and the extracellular matrix (ECM).

SUMMARY

Some aspects of the present disclosure provide human patient-derived brain tumor models that include cell sources (e.g., tissues) from a wide range of molecular subgroups. In some embodiments, the brain tumor models are pediatric brain tumor models. Most commercially available brain tumor cell lines are developed from adult tumors and show significant genetic and phenotypic differences compared to actual pediatric brain tumors. Many of the existing cell lines lack detailed genetic characterization, and most were not directly compared to the original tumor, making clinical relevance difficult to assess. Available primary cells from pediatric brain tumors are limited, and their viability post-cryopreservation is uncertain. The studies described herein use fresh pediatric brain tumor tissue to establish in vitro models that are designed to closely replicate the characteristics of an original tumor in a patient. Thus, the present disclosure provides, in some aspects, multiple brain tumor models, each representing a patient-specific molecular subtype. These studies contribute to the banking of pediatric brain tumors and also provide an expandable tumor cell source representing different patient-specific molecular subtypes, thus providing valuable resources for developing cancer therapies, for example. Furthermore, the human patient-derived brain tumor models provided herein can be used to identify, develop, and/or assess brain cancer therapies.

Some aspects of the present disclosure provide an in vitro brain tumor model comprising a brain tumor sample obtained from a patient, a three-dimensional scaffold, extracellular matrix, endothelial cells, and culture media.

In some embodiments, the brain tumor sample comprises dissociated brain tumor cells.

In some embodiments, the brain tumor sample comprises brain tumor tissue.

In some embodiments, the patient is a pediatric patient.

In some embodiments, the brain tumor sample is from a brain tissue selected from the group consisting of: white matter, gray matter, cerebrospinal fluid (CSF), medulla oblangata, pons, ventricles, cerebellum, tectum, pretectum, tegmentum, cerebral peduncle, cranial nerve nuclei, epithalamus, thalamus, hypothalamus, subthalamus, pituitary gland, rhinencephalon, and cerebral cortex tissue.

In some embodiments, the brain tumor sample is from a tumor selected from the group consisting of: neuromas, astrocytomas, chrodomas, central nervous system (CNS) lymphomas, craniopharyngiomas, brain stem gliomas, ependymomas, mixed gliomas, optic nerve gliomas, subependymomas, medulloblastomas, meningiomas, metastatic brain tumors s, oligodendrogliomas, pituitary tumors, primitive neuroectodermals, schwannomas, pineal tumors, rhabdoid tumors, and Juvenile Pilocytic Astrocytomas (JPAs).

In some embodiments, three-dimensional scaffold comprises silk protein.

In some embodiments, the silk protein is *Bombyx mori* silk protein.

In some embodiments, the three-dimensional scaffold is coated with the extracellular matrix.

In some embodiments, the extracellular matrix comprises poly-D-lysine.

In some embodiments, the extracellular matrix comprises collagen.

In some embodiments, the extracellular matrix comprises a gelatinous protein mixture secreted by Engelbreth-Holm-Swarm (EHS) mouse sarcoma cells (e.g., MATRIGEL®).

In some embodiments, the extracellular matrix comprises a 1:1 ratio of the collagen to the gelatinous protein mixture secreted by EHS mouse sarcoma cells (e.g., MATRIGEL®).

In some embodiments, the three-dimensional scaffold further comprises $2 \times 10^3$-$2 \times 10^5$ endothelial cells.

In some embodiments, the three-dimensional scaffold further $2 \times 10^4$ endothelial cells.

In some embodiments, the culture media comprises a reagent selected from the group consisting of neural basal media (e.g., NEUROBASAL™-A Medium) optionally supplemented with B-27, recombinant human fibroblast growth factor, recombinant human epidermal growth factor, and microvascular endothelial cell growth media (e.g., EGM™-2 MV).

In some embodiments, the culture media comprises neural basal media (e.g., NEUROBASAL™-A Medium) optionally supplemented with B-27, recombinant human fibroblast growth factor, recombinant human epidermal growth factor, and microvascular endothelial cell growth media (e.g., EGM™-2 MV).

Other aspects of the present disclosure provide a method for assessing an effect of an agent on a brain tumor sample, the method comprising: contacting the in vitro brain tumor model of any one of the preceding claims with an agent; and assessing an effect of the agent on the in vitro brain tumor sample.

In some embodiments, the agent is a chemotherapeutic agent.

In some embodiments, the agent is a candidate chemotherapeutic agent for treatment of the brain tumor.

In some embodiments, the method further comprises comparing the effect of the agent on the in vitro brain tumor sample to an effect of the agent on the patient, optionally on the brain tumor of the patient, wherein the patient is undergoing therapy with the agent.

In some embodiments, the method further comprises comparing the effect of the agent on the in vitro brain tumor sample to an effect of another agent on the patient, optionally on the brain tumor of the patient, wherein the patient is undergoing therapy with the other agent.

In some embodiments, the method further comprises changing the therapy of the patient based on the effect of the agent on the in vitro brain tumor sample.

In some embodiments, the method further comprises contacting at least one additional agent brain tumor model of any one of the preceding claims with the agent, and comparing an effect of the agent on the in vitro brain tumor models.

In some embodiments, the method further comprises contacting at least 5, at least 10, at least 25, at least 50, or at least 100 additional brain tumor models of any one of the preceding claims with the agent, and comparing an effect of the agent on the in vitro brain tumor models.

Yet other aspects of the present disclosure provide a collection of in vitro brain tumor models of any one of the preceding claims, wherein each in vitro brain tumor model comprises a brain tumor sample from a different patient.

In some embodiments, the collection comprises at least 5, at least 10, at least 25, at least 50, or at least 100 different in vitro brain tumor models.

Further aspects of the present disclosure provide a method of producing the in vitro brain tumor model of any one of the preceding claims, the method comprising: (a) coating the three-dimensional scaffold with the poly-D-lysine; (b) seeding the poly-D-lysine-coated three-dimensional scaffold with the brain tumor cells; (c) infusing the poly-D-lysine-coated three-dimensional scaffold with the endothelial cells; (d) infusing the endothelial cell-infused poly-D-lysine-coated three-dimensional scaffold with a mixture of the collagen gel and the gelatinous protein mixture secreted by EHS mouse sarcoma cells; and (e) immersing the scaffold of (d) in the culture media.

BRIEF DESCRIPTION OF THE DRAWINGS

(FIG. 4A) Tumor spheroids in 3D silk material-based porous scaffolds. (FIG. 4B) Capillary-like tubular structures in ependymoma-endothelial (hMEC/D3 cell line) co-cultures in 3D. Scale bar, 100 um.

(FIG. 7A) Maximum projection of 3D image stacks of drug-treated models. Number indicates drug concentration in mM. Ctrl, control. Scale bar, 200 mm. (FIG. 7B) Quantification of live cell counts in relation to drug doses.

DETAILED DESCRIPTION

Figure 1:
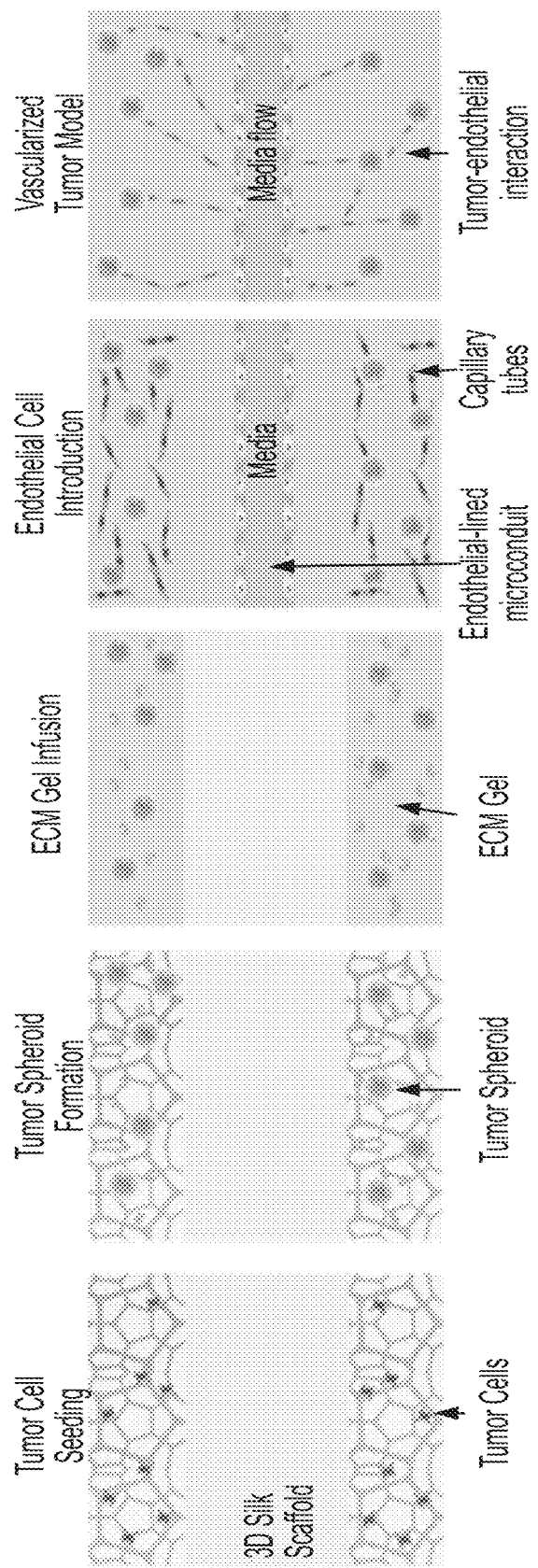
FIG. 1 shows a process for engineering three dimensional (3D) brain tumor models.

Preclinical drug-screening based on the human patient-derived brain tumor models of the present disclosure, in some embodiments, enables a detailed and clinically-relevant analysis of brain tumor responses to various drugs. A current challenge with targeted therapies is the identification of effective chemotherapeutic agents, which depends in part on the molecular subtype of particular brain tumors. For pediatric brain tumors, for example, with fewer cases than adults and an increasing number of subtypes, clinical trials for targeted therapy face the challenge of low numbers of eligible patients and significant resources (e.g., cost and time) involved. While one option is to assess genome changes in tumors of individual patients, these data are difficult to interpret in terms of prognosis, drug response, or patient outcome.

To address these challenges, provided herein, in some aspects, is a systematic preclinical platform technology that links genetic changes to drug responses for efficient selection of clinical therapeutic candidates (e.g., drug candidates). As discussed in the Examples section below, the present disclosure provides, in some aspects, a platform that uses human patient-derived brain tumor models to: (1) directly test drug sensitivity of clinically approved drugs in a personalized treatment approach concurrent with a patient's ongoing chemotherapy; (2) evaluate on-target drug actions and/or drug resistance by comparing key phenotypic features of patient-derived brain tumor models to that patient's clinical chemotherapy response; (3) predict alternative therapy outcomes by comparison of the results of the standard care regimen (e.g., shared by the models and the patient) with the response to other drug candidates (e.g., applied only to the models); (4) elucidate drug mechanisms by examining the correlations between expression changes across different outcomes; and (5) identify functional differences between molecular subtypes by comparing drug responses of different patient-derived brain tumor models to the same standard-care chemotherapy. This information can be used, for example, to match patients to an effective therapy.

Furthermore, recapitulating the three dimensional brain microenvironment for in vivo-like brain tissue growth provides a platform for advancing the field's understanding of brain tumor progression (e.g., childhood brain tumor progression) as well as normal brain development. Current in vitro cultures do not accurately produce many types of high-grade pediatric brain tumors (e.g., ependymoma), thus it has been difficult to model and study in vivo malignancies. Moreover, it has been difficult to derive from various human brain tumors neurospheres and organoids, which likely have important roles in tumor development and progression. The weaknesses in current in vitro models may be due, at least in part, to a lack of brain-specific requirements. For example, most current in vitro models lack brain-enriched extracellular matrix (ECM) components (e.g., hyaluronic acid), soluble factors, and vasculature, which affect brain tumor aggressiveness and patient prognosis. Further still, existing in vitro brain tissue models do not account for the changing microenvironment of a developing brain. Little is known about developmental changes in the brain microenvironment or how they might contribute to tumor development. Yet, understanding the roles of these microenvironmental factors is important for pediatric brain tumors, for example, because they are strongly affected by a child's age and vary with brain region.

The studies proposed here begin to address the role of microenvironmental factors by recapitulating the in vivo microenvironment primary brain tumor tissue from children. This is achieved, in some embodiments, by first assembling known factors (e.g., ECM, soluble factors, oxygen, and vasculature) in 3D to support in vivo-like tissue formation, and then incorporating tumor cell-secreted ECM and soluble factors for patient-specific conditioning of each model. In this controlled system, the role of each environmental factor can be assessed for its contribution to certain cell behavior (e.g., replication and/or migration), tissue structural changes (e.g., interaction with endothelial capillaries), and/or involvement of certain cell types (e.g., cancer stem cell vs. abnormally differentiated glial cells), thereby elucidating the process of abnormal tumor growth. Findings of how specific brain cell types respond to microenvironmental factors and with what molecular mechanisms also provides an understanding of other developmental processes, beyond brain tumor development.

Various embodiments of the present disclosure provide bioengineered 3D brain tissue models that have been adapted for human brain tumor tissue (3D brain tumor models). In some embodiments, the 3D brain tumor models include a porous 3D scaffold made of silk fibroin solution prepared from *Bombyx mori* (silkworm) cocoons (Tang-Schomer et al. *PNAS* 2014; 111(38): 13811-13816, incorporated herein by reference). The 3D brain tumor models, in some embodiments, comprise brain-specific ECM components (Sood et al. *ACS Biomater Sci Eng* 2016; 2(1): 131-140, incorporated herein by reference) and include cells from tumor resection surgery, for example. Recapitulating the 3D microenvironment of a tumor niche in vitro provides a 3D brain tumor model that closely mimics the original tumor tissue from which the cells are derived. Due to the shared genetic background, these patient-derived biomimetic 3D brain tumor models can be used to assess biological responses to various drug treatments, similar to the in vivo response from the tumor of the patient, for example, concurrent with chemotherapy. This direct comparison of the patient-derived 3D brain tumor model (including the drug response assessment) with the primary tumor and the patient's clinical outcome can be used to develop and/or guide personalized clinical therapies.

Thus, the patient-derived 3D brain tumor models of the present disclosure have several advantages over current cell line-based tumor model systems. For example, the patient-derived 3D brain tumor models are more physiologically relevant, provide more control over the tumor microenvironment (e.g., ECM, oxygen, soluble factors, and/or vasculature, e.g., incorporating brain microvascular endothelial cells and promoting interconnected vasculature), and enable the use of proteomic and genomic information produce a patient-specific tumor phenotype. Further, comparing drug responses from the patient-derived 3D brain tumor models compared to the concurrent clinical response of the patient reveals both meaningful correlations and differences. Use of these patient-derived 3D brain tumor models to characterize drug-associated molecular changes, for example, provides an important link between genotypes and phenotypes for further development of personalized therapy.

In some embodiments, the present disclosure provides a collection of in vitro brain tumor models, wherein each in vitro brain tumor model comprises: a three-dimensional scaffold; a brain tissue obtained from a patient; and extracellular matrix.

Three-Dimensional Scaffold

A three-dimensional scaffold is a structure that is designed to mimic in vivo conditions of a tissue. Three-dimensional scaffolds are typically composed of porous, biocompatible, and biodegradable materials that serve to provide suitable mechanical support, physical, and biochemical stimuli for optimal cell growth and function. Non-limiting examples of three-dimensional scaffolds include hydrogels, tubes, sponges, composites, fibers, microspheres, and thin films.

The porosity and pore size of three-dimensional scaffolds has direct implications on the functionality of the scaffold. Open porous surfaces and interconnected networks of scaffold components are important for cell nutrition, proliferation, tissue vascularization, and formation of new tissues. Materials with high porosity also enable the effective uptake and release of soluble factors, such as proteins and nucleic acids, into and out of cells.

A three-dimensional scaffold can be composed of naturally-occurring materials, man-made materials, or a mixture of naturally-occurring and synthetic materials. Examples of scaffold materials include, without limitation, minerals (e.g., hydroxyapatite), proteins (e.g., elastin, alginate, albumin, fibroin, and collagen), metals (e.g., titanium, gold), and composites (e.g., poly(lactic-co-glycolic acid)/poly(ε-caprolactone) PLGA/PCL, halloysite nanotubes).

In some embodiments, a three-dimensional scaffold comprises a naturally-occurring material *Bombyx mori* silk fibroin protein. *Bombyx mori* is a silkworm whose cocoons contain the silk fibroin protein. Silk fibroin is used in numerous biomaterial applications because it is biocompatible with in vivo models, it has controllable degradation rates that range from hours to years, and it can be chemically modified to altering surface properties of the three-dimensional scaffold or to immobilize growth factors. See, e.g., Tang-Schomer et al. *PNAS* 2014; 111(38): 13811-13816, incorporated herein by reference.

Tissues

A tissue is an ensemble of similar cells and extracellular matrix from the same origin that carry out a specific function. Tissues in mammals are classified as connective, muscular, nervous, or epithelial. In some embodiments a tissue is a nervous system tissue. Nervous system tissue includes neurons which receive and transmit impulses and glial cells which assist the transmission of impulses and provide nutrients to neurons.

In some embodiments, a tissue is from the central nervous system (CNS). The CNS includes the brain and the spinal cord. In some embodiments, a tissue is a brain tissue. Non-limiting examples of brain tissue include white matter, gray matter, cerebrospinal fluid (CSF), medulla oblangata, pons, ventricles, cerebellum, tectum, pretectum, tegmentum, cerebral peduncle, cranial nerve nuclei, epithalamus, thalamus, hypothalamus, subthalamus, pituitary gland, rhinencephalon, and cerebral cortex.

In some embodiments, a brain tissue is obtained from a patient. A patient may be a human, a mouse, a rat, a pig, a dog, a cat, or a non-human primate. In some embodiments, a patient is a human. In some embodiments, a brain tissue is obtained from a pediatric patient, e.g., a human child who is less than 18 years old (e.g., 1-5, 1-10, 1-15 years old). In some embodiments, a brain tissue is obtained from a fetus (e.g., unborn mammal, e.g., between 8-37 weeks post conception). In some embodiments, fetal brain tissue is obtained from a human fetus.

In some embodiments, the brain tissue is from a patient with cancer (e.g., abnormal, uncontrolled division of cells within a tissue). In some instances, cancerous cells metastasize to non-cancerous tissues. A brain cancer can be a primary cancer or a secondary cancer, wherein a primary cancer originates in brain cells and a secondary cancer metastasizes to brain cells. Non-limiting examples of brain cancers include acoustic neuroma, astrocytoma, chrodoma, central nervous system (CNS) lymphoma, craniopharyngioma, brain stem glioma, ependymoma, mixed glioma, optic nerve glioma, subependymoma, medulloblastoma, meningioma, metastatic brain tumors, oligodendroglioma, pituitary tumors, primitive neuroectodermal, schwannoma, pineal tumor, rhabdoid tumor, and Juvenile Pilocytic Astrocytoma (JPA).

In some embodiments, the brain tissue comprises tumor spheroids. Tumor spheroids are three-dimensional structures comprising cancer cells that are formed from monolayer tumor cells that are grown by various in vitro methods (e.g., liquid-overlay, spinner flask, and gyratory rotation systems). The cellular organization of tumor cells in spheroids more closely recapitulates in vivo tumors structures than either two-dimensional of one-dimensional in vitro tumor structures.

In some embodiments, the tumor spheroids are surrounded by vasculature. Vasculature includes the blood vessels (e.g., arteries, arterioles, veins, venuoles, and capillaries) or the arrangement of bloods vessels in a tissue. The vasculature of a tissue transports nutrients, soluble factors, hormones, chemical signals, and cells.

In some embodiments, a collection of brain tissue tumor models comprises at least 2 brain tumor models. In some embodiments, the collection comprises at least 5, at least 10, at least 25, at least 50, at least 100 brain tumor models.

Extracellular Matrix

Extracellular matrix (ECM) is the collection of molecules secreted by cells into the extracellular space. The ECM is composed of functional proteins (e.g., collagen and elastin), proteoglycans (e.g., heparan sulfate, chondroitin sulfate, and keratan sulfate), non-proteoglycan polysaccharides (e.g., hyaluronic acid) and a variety of growth factors, cytokines, ions, and water that provide structural support to cells. The composition of ECM varies between tissues, but the ECM regulates cell proliferation, differentiation, and migration.

One function of a three-dimensional scaffold is to mimic the actual ECM of the tissue. Different tissues have their own unique ECM compositions and structures, but in general the ECM is a porous meshwork of proteins and glycosaminoglycans that can be remodeled by cross-linking of collagen and elastin, wherein an increase in cross-linking decreases the porosity of the ECM. Remodeling of the ECM is important to processes such as cellular development, wound repair, and morphogenesis.

The ECM of the adult human brain is highly organized and unique in composition compared to other tissues. The brain ECM contains low levels of fibrous proteins and mainly includes aggregating proteoglycans, allowing a less rigid structure than other tissues. The composition, quantity, and structure of the ECM in the brain changes dramatically during the development of a mammal. The fetal brain ECM includes a higher level of fibrous proteins and a lower level of aggregating proteoglycans compared with the adult brain, which supports the growth of axons and the interconnection of neurons.

In some embodiments, the ECM comprises hyaluronic acid. Hyaluronic acid is a polysaccharide consisting of alternating residues of D-glucouronic acid and N-acetylglucosamine. Hyaluronic acid confers the ability to resist compression of the ECM by being able to absorb significant amounts of water. Hyaluronic acid acts as a regulator of cell behavior including embryonic development, healing, inflammation, and tumor development.

In some embodiments, the ECM comprises soluble factors present in brain tissue. Soluble factors are molecules in tissue that regulate cell growth, cell proliferation, cell division, inflammation, angiogenesis and tumorigenesis. Non-limiting examples of soluble factors in the brain include vascular endothelial growth factor (VEGF), interleukin (IL)-10, prostaglandin-2 (PGE-2), interleukin (IL)-6, interleukin (IL)-1α, fibroblast growth factor (FGF), hepatocyte growth factor (HGF), heparanase, matrix metalloproteases (MMPs).

In some embodiments, the ECM comprises soluble factors present in fetal brain tissue. Soluble factors present in fetal brain tissue promote neural growth and development, and some of these factors are not present in adult brain tissue. Non-limiting examples of soluble factors in the fetal brain tissue include neurotrophic factors (e.g., brain-derived neurotrophic factor, nerve growth factor, neurotrophin-3, neurotrophin-4, glial cell line-derived neurotrophic factor, artemin, neurturin, persephin, ephrin), growth factors (e.g., epidermal growth factor, neuregulins), and transforming growth factors (e.g., transforming growth factor α, transforming growth factor β).

In some embodiments, the soluble factors present in the fetal brain tissue are not present in adult brain tissue. In some embodiments, the soluble factors present in the fetal brain tissue are present in a greater amount in fetal brain tissue than in adult brain tissue. In some embodiments, the soluble factors are present in both the fetal brain tissue and adult brain tissue.

In Vitro Screening

In some embodiments, the present disclosure is a method for assessing an effect of an agent on a brain tissue tumor sample, the method comprising: contacting an in vitro tumor brain model with an agent, assessing an effect of the agent on the in vitro brain tumor model, and optionally identifying the agent as a clinical drug candidate. The contacting step includes exposing an in vitro tumor brain model with an agent (e.g., adding the agent to the brain tumor model). A clinical drug candidate may be any agent suspect of having a desired therapeutic effect. In some embodiments, a clinical candidate is an agent with therapeutic potential and optimized activity and specificity.

The step of assessing includes measuring an effect of an agent on an in vitro tumor brain model. Non-limiting examples of effect that may be assessed for cells and/or tissues include tissue metabolism (e.g., Alamar blue assay, crystal violet assay, MTT assay), cell compositions (e.g., flow cytometry, laser scanning cytometry), and/or tissue morphology and structure (e.g., immunostaining, confocal 3D imaging).

Agents herein include polypeptides, polynucleotides, and small molecule drugs. In some embodiments, agent is a polypeptide (e.g., protein or peptide). Non-limiting examples of proteins that may be used as provided herein includes programmable nucleases and antibodies.

Non-limiting examples of programmable nucleases include zinc-finger nucleases (ZFNs), transcription activator-like effector nucleases (TALENs) and RNA-guided engineered nucleases (RGENs) derived from the bacterial clustered regularly interspaced short palindromic repeat (CRISPR)-Cas (CRISPR-associated) system. These programmable nucleases enable targeted genetic modifications in cells. ZFNs and TALENs are composed of DNA-binding proteins and the FokI nuclease domain. RGENs are derived from the type II CRISPR-Cas adaptive immune system in bacteria and are composed of guide RNAs and a Cas protein (or homolog, ortholog, or variant thereof, or nickase derivative thereof). Examples of RGENs include, without limitation, Cas9, Cas3, Cas10, and Cpf1.

Non-limiting examples of antibodies include monoclonal antibodies, polyclonal antibodies, single chain fragment antibodies (scFvs), Nanobodies®, affibodies, diabodies, triabodies, and tetrabodies. An antibody may be a human antibody, a humanized antibody, or a chimeric antibody.

In some embodiments, the agent is a polynucleotide (e.g., RNA or DNA). In some embodiments, a polynucleotide regulates the expression and/or activity of a target gene in the in vitro tumor brain model. Non-limiting examples of polynucleotides include RNA interference molecules and antisense RNA molecules.

RNA interference refers to a biological process by which RNA molecules inhibit gene expression by binding target DNA molecules and inhibiting transcription, or by binding messenger RNA (mRNA) molecules and inhibiting translation. Non-limiting examples of RNA interference molecules that may be used as provided herein include microRNAs (miRNAs), small interfering RNAs (siRNAs), and short hairpin RNAs (shRNAs), which bind to and inhibit expression of a gene of interest. In some embodiments, a RNA interference molecule inhibits gene expression by binding to the gene and blocking transcription or promoting degradation of the mRNA encoding by the gene.

Antisense RNA molecules are single-stranded RNA oligonucleotides that bind a nucleic acid that encodes a polypeptide, thereby inhibiting transcription and translation of that polypeptide. Non-limiting examples of antisense RNA molecules include short non-coding RNAs (<200 nucleotides) and long non-coding RNAs (≥200 nucleotides).

In some embodiments, the agent is a small molecule drug. A small molecule drug is a low molecular weight (e.g., less than or equal to 900 daltons) substance that enters cells, where it can affect other molecules such as proteins and nucleic acids. In some embodiments, drugs are chemotherapeutic drugs used to treat cancer. In some embodiments, drugs are chemotherapeutic agents used to treat brain cancer. Non-limiting examples of drugs used to treat brain cancer include Afinitor® (everolimus), Avastatin® (bevacizumab), BiCNU® (carmustine), Gliadel Wafer® (Carmustine Implant), Lomustine®, Temodar® (temozolomide). In some embodiments, the agent that is contacted with the in vitro tumor brain model is a drug.

The agent may be contacted with the in vitro brain tumor model as a single dose or as multiple doses over the course of days, weeks, months, or years. The dose/dosage of the agent may be determined by a skilled medical practitioner, taking into consideration one or more factors, such as type of agent and severity of the disease.

In some embodiments, the method further comprises comparing the effect of the agent on the in vitro brain tumor model to an effect of the agent on the patient, wherein the patient is undergoing therapy with the agent. Comparing is evaluating the differences in the effect of the agent in the in vitro brain tumor model and the patient.

The agent may be administered to the patient. Non-limiting examples of routes of administration include oral (e.g., tablet, capsule, or liquid), intravenous, subcutaneous, inhalation, intranasal, intrathecal, intramuscular, intraarterial, and intraneural.

In some embodiments, the method further comprises comparing the effect of the agent on the in vitro brain tumor model to an effect of another agent on the patient, wherein the patient is undergoing therapy with the other agent. The other agent may be a drug, a nucleic acid oligonucleotide, or a polypeptide.

In some embodiments, the in vitro brain tumor model is contacted with at least 2 agents. In some embodiments, the in vitro brain tumor model is contacted with at least 10 agents. In some embodiments, the in vitro brain tumor model is contacted with at least 2, at least 3, at least 4, at least 5, at least 6, at least 7, at least 8, at least 9, or at least 10 agents.

Additional Embodiments

Additional embodiments of the present disclosure are encompassed by the following numbered paragraphs:

1. A method for assessing an effect of an agent on a brain tissue tumor sample, the method comprising:
    contacting an in vitro brain tumor model with an agent, wherein the in vitro brain tumor model comprises a three-dimensional scaffold, a brain tumor sample obtained from a patient, and brain extracellular matrix;
    assessing an effect of the agent on the in vitro brain tumor model; and
    optionally identifying the agent as a clinical drug candidate.

2. The method of paragraph 1 further comprising comparing the effect of the agent on the in vitro brain tumor model to an effect of the agent on the patient, wherein the patient is undergoing therapy with the agent.

3. The method of paragraph 1 further comprising comparing the effect of the agent on the in vitro brain tumor model to an effect of another agent on the patient, wherein the patient is undergoing therapy with the other agent.

4. The method of paragraph 2 or 3 further comprising changing the therapy of the patient based on the effect of the agent on the in vitro brain tumor model.

5. A method for comparing effects of an agent on different brain tissue tumor samples, the method comprising:
    contacting a first in vitro brain tumor model with an agent, wherein the in vitro brain tumor model comprises a three-dimensional scaffold, a brain tumor sample obtained from a first patient, and brain extracellular matrix;
    contacting a second in vitro brain tumor model with an agent, wherein the in vitro brain tumor model comprises a three-dimensional scaffold, a brain tumor sample obtained from a second patient, and brain extracellular matrix; and
    comparing an effect of the agent on the first in vitro brain tumor model to an effect of the agent on the second in vitro brain tumor model.

6. A collection of in vitro brain tumor models, wherein each in vitro brain tumor model comprises:
    a three-dimensional scaffold;
    a brain tissue obtained from a patient; and extracellular matrix.

7. The collection of paragraph 6, wherein the three-dimensional scaffold comprises *Bombyx mori* silk fibroin.

8. The collection of paragraph 6 or 7, wherein the extracellular matrix comprises soluble factors present in brain tissue.

9. The collection of any one of paragraphs 6-8, wherein the brain tissue comprises fetal brain tissue.

10. The collection of paragraph 9, wherein the extracellular matrix comprise soluble factors present in fetal brain tissue.

11. The collection of any one of paragraph 6-10, wherein the extracellular matrix comprises hyaluronic acid.

12. The collection of any one of paragraphs 6-11, wherein the brain tissue comprises tumor spheroids.

13. The collection of paragraph 12, wherein the tumor spheroids are surrounded by vasculature.

14. The collection of any one of paragraphs 6-13 comprising at least two brain tumor models.

15. The collection of paragraph 14 comprising at least 5, at least 10, at least 25, at least 50, or at least 100 brain tumor models.

EXAMPLES

Example 1

Three dimensional (3D) tumor models are designed to simulate in vivo tumor growth (FIG. 1), with different starting conditions (see Engineering Inputs below). An adaptive workflow (FIG. 2) incorporates additional components (e.g., ECM and endothelial cells) at different time points. Phenotypic features including cell composition, tissue structure, and morphology are characterized for the bioengineered models.

Tumor growth involves single cancer stem/initiating-cell residence, clonal expansion, ECM remodeling and interactions with the microvasculature. Conventional tissue culture conditions (e.g., 2D polystyrene surface, DMEM+10% FBS, 5% $CO_2$, 37° C.) fail to support primary cultures of many types of pediatric brain tumor cells. We examine parameters known to affect tumor growth in our 3D silk scaffold-based system (e.g., ECM, oxygen, soluble factors, vascular component), in chemically defined medium, with a process that simulates different growth phases towards a vascularized tumor model (FIG. 1).

Figure 2:
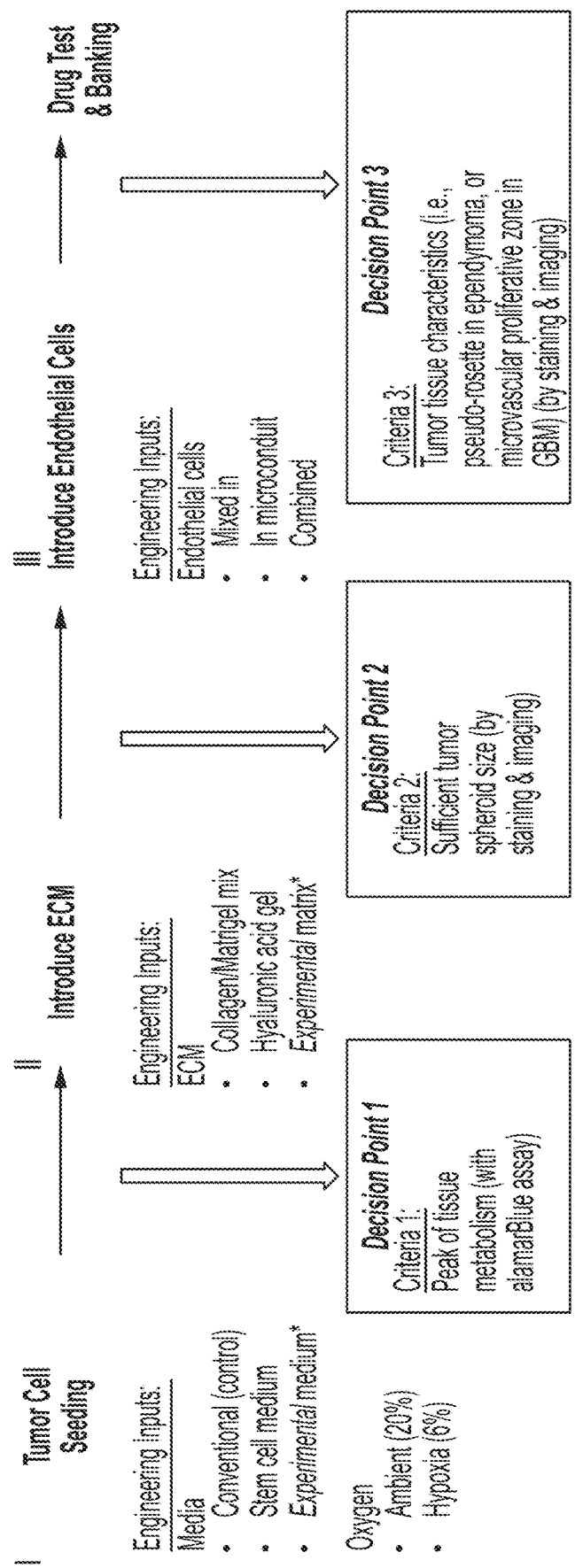
FIG. 2 shows a work flow diagram with engineering inputs, decision points, and criteria.

Fresh pediatric brain tumor tissue is obtained and dissociated into single cells and seeded onto polylysine coated 3D silk scaffolds. 3D tissue models are generated with different media, oxygen levels, and timing of ECM gel matrix and endothelial cell introduction, as outlined in the below (FIG. 2).

To adjust for differences in proliferation and cell death during the first week of cell culture, the work flow is designed with flexible timing (Decision Points) based on phenotypic features (Criteria) of each patient-derived culture cohort (FIG. 2). Replicates of 3D tissue models are sacrificed at set time-points for assessment, while the remaining cultures are kept alive. Among 3D models with different starting conditions (Stage I, tumor cell seeding), those under optimal media and oxygen level first reach peak tissue metabolism (Criteria 1). The faster-growing cohorts proceed to the next stage of ECM introduction at Decision Point 1, when different ECM types are tested (Stage II). Within this group, 3D models with sufficiently-sized tumor spheroids (200-500 μm) (Criteria 2) proceed to Stage III at Decision Point 2, when endothelial cells are introduced into a perfusing micro-conduit as well as within the model. The co-cultured 3D models mature to develop interconnected vascular network surrounding tumor spheroids. Models presenting tumor tissue characteristics, such as ependymoma-like pseudo-rosette (Criteria 3), proceed to drug testing. At each stage, samples of optimized models are frozen-stored for DNA/RNA/protein extraction and genomic characterization, and dissociated for cryopreservation for expansion.

Engineering Inputs 3D silk scaffold: Silk solution and porous scaffolds are prepared from silkworm cocoons as described previously (Tang-Schomer et al. 2014). Salt-leached porous silk mats are provided. Donut-shaped silk scaffolds (5 mm dia.×2 mm h.) are generated with a biopsy punch. Scaffolds are autoclaved, coated with polylysine and washed prior to cell seeding.

Brain tumor tissue: Patient tumor tissue is obtained following surgical removal. The tissue is transported to the laboratory in chilled RPMI-1640 medium containing antibiotics and arrives in <4 hour post-surgery. The tissue specimen is mechanically dissociated and seeded onto 3D silk scaffolds at ~50,000 cells/scaffold.

Media: Tested media types include: DMEM+10% FBS as control, Neurobasal/B27+bFGF+EGF used for cancer stem cell expansion, and Experimental Medium that is adjusted with tumor-secreted factors.

Matrix components: Tested ECM components include collagen type I (structural stability), Matrigel (bioactivity), hyaluronic acid gel (brain enriched ECM), and Experimental Matrix that is adjusted with tumor-specific ECM.

Oxygen level: 20% (normoxia) and 6% (hypoxia)

Endothelial cells: Human cerebral endothelial cell line hMEC/D3 is used.

Outcome Assessments

Tissue metabolism: AlamarBlue assay is used to measure 3D culture metabolism and tissue viability, as in previous studies (Tang-Schomer et al. 2014; Tang-Schomer et al. J Tissue Eng Regen Med 2018; 12: 1247-1260). Assay readouts are measured on a micro-plate spectrophotometer (BioTek Epoch).

Cell compositions: Cell types in 3D cultures are characterized by flow cytometry, as previously described (Tang-Schomer et al. 2018). Briefly, dissociated and stained cells undergo flow cytometry with a flow panel including markers for: 1) neural/cancer stem cells, 2) astrocytes, 3) neurons, 4) endothelial cells, 5) mitosis, and 6) chemotaxis. Cell percentages are quantified with FlowJo software.

Tissue morphology and structure: Standard ICC/IFC and 3D confocal imaging procedures are used as described previously (Tang-Schomer et al. 2014). Specific antibody markers are used to characterize morphological features, including 3D distribution of different cell types and proliferating vs. apoptotic cells, tumor spheroid size, and tumor vascular structure.

Data Analysis

We use established methods to analyze phenotypic data (e.g., images and metabolism assay), as previously described (Tang-Schomer et al. 2014). Flow cytometry data statistics are analyzed as previously described (Tang-Schomer et al. 2018).

Expected Outcomes and Interpretations

These phenotypic assays generate a large amount of useful data that can collaboratively provide insights into certain cellular processes involved in tumor-specific growth. With our studies, we have observed that Nestin+ stem cells are found to highly associate with certain types of tumor growth, especially under hypoxia. Morphological analysis further revealed that these cells are highly mitotic (Ki67+). If consistent among multiple patients of the same tumor type, these results may suggest a dis-regulated neural differentiation process underlying tumorogenesis for this particular tumor type. Correlating these phenotypic outcomes with molecular characterization will uncover the associated genes, pathways and drug targets.

Example 2

Brain tumors are the leading cause of cancer-related deaths in children, and more than 4,600 children will be diagnosed with a brain tumor this year in the US. Unfortunately, standard treatments are optimized for adult populations and often fail for child cancer patients, due in part to the unique characteristics of pediatric brain tumors. Tailored therapies need preclinical pediatric brain tumor models representing a wide range of molecular subtypes. However, there is a lack of reliable brain tumor cell source, and existing cell lines have lost the characteristics of the original tumor tissue. To address this gap, we developed a bioengineered model system that can mimic the brain tumor microenvironment. Previously we have developed a functional 3D brain tissue model using silk materials and rat cortical neurons 1. We recently used the model to successfully support regenerative growth of normal human brain cells in culture with neurosurgical patients' brain tissue 2. In this study, we extended this modeling scheme to pediatric brain tumors with fresh patient samples. We predicted that a 3D tissue model composed of reconstituted patient tumor cells in a brain-mimicking microenvironment will faithfully recapitulate the original tumor's characteristics. By comparing the transcriptome profiles of 3D tumor models constructed under different conditions with the patient's original tumor tissue, we identified optimal 3D modeling conditions for different tumor types. In particular, medulloblastoma models exhibited nearly indistinguishable transcriptomic profiles from the matching patient tumor. Mass spectrometry analysis of the culture supernatants of 3D models showed that the release profiles (secretomics) were largely clustered according to tumor types. Case drug studies using patient-derived tumor models demonstrated tumor type-associated drug responses. Together, these data show that our 3D brain tumor models can realize tumor type-specific phenotypic and molecular characteristics. These studies will help establish an individualized tumor sample-to-drugs pipeline for personalized drug testing.

To date, we have generated more than one thousand 3D in vitro models with fresh tumor tissues from 11 patients, including medulloblastoma (n=4), ependymoma (n=3), astrocytoma including glioblastoma (n=1), and anaplastic astrocytoma (n=3).

Figures 3A, 3B, 3C:
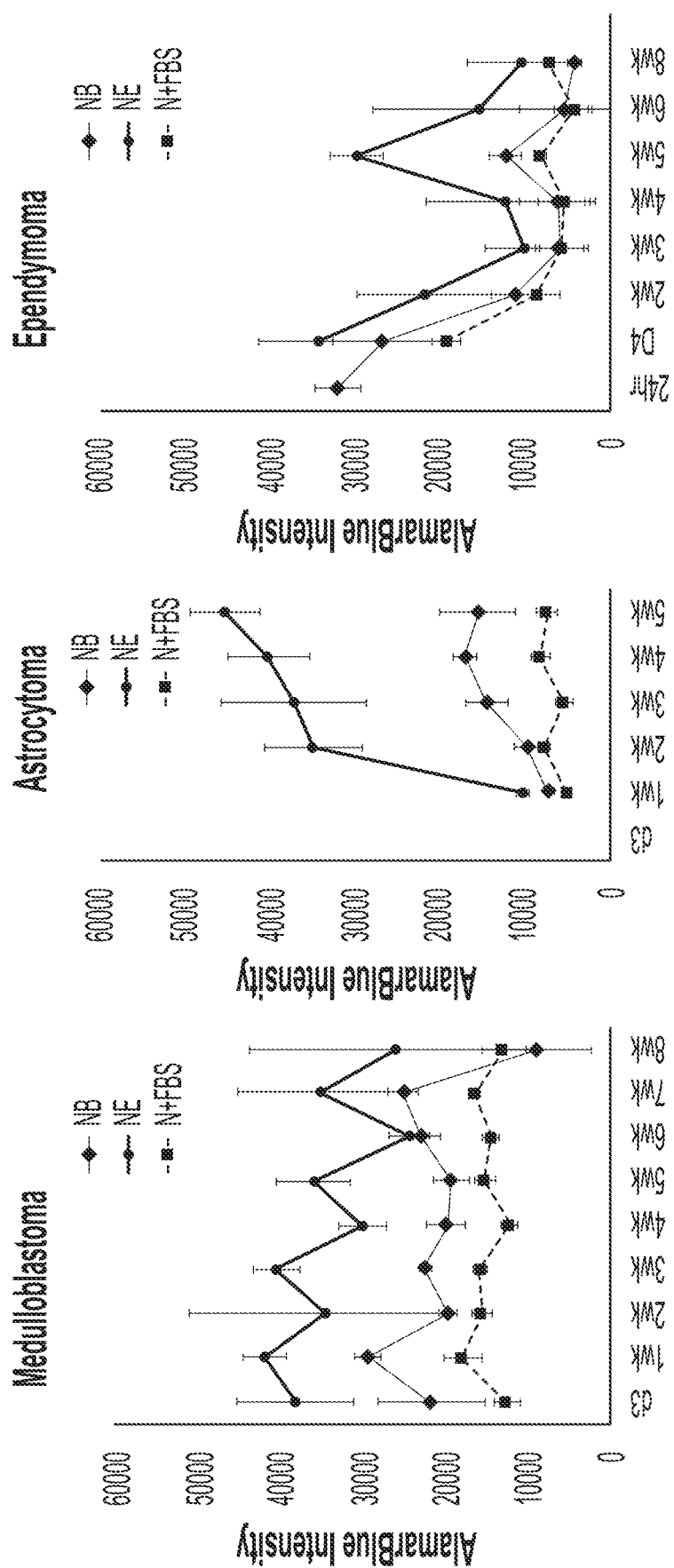
FIGS. 3A-3C show the metabolism of 3D tumor models by alamarBlue assay showing "NE" as preferred media type.

FIG. 3 shows alamarBlue assay results of 3D tissue models for viability assessment. In the chemically defined "NE" media, 3D models showed better growth than those in serum-containing "N+FBS" media or neurobasal media "NB" (n=4/per condition per time point).

Figure 4A:
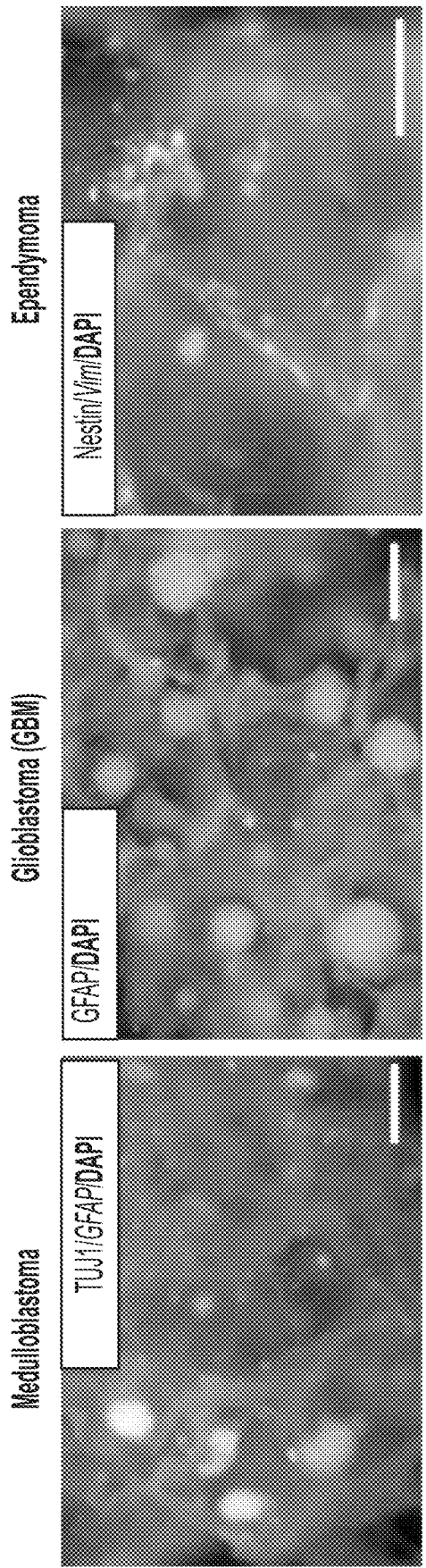
FIGS. 4A-4B shows tumor-specific phenotypes of 3D pediatric patient-derived brain tumor models.
Figure 4B:
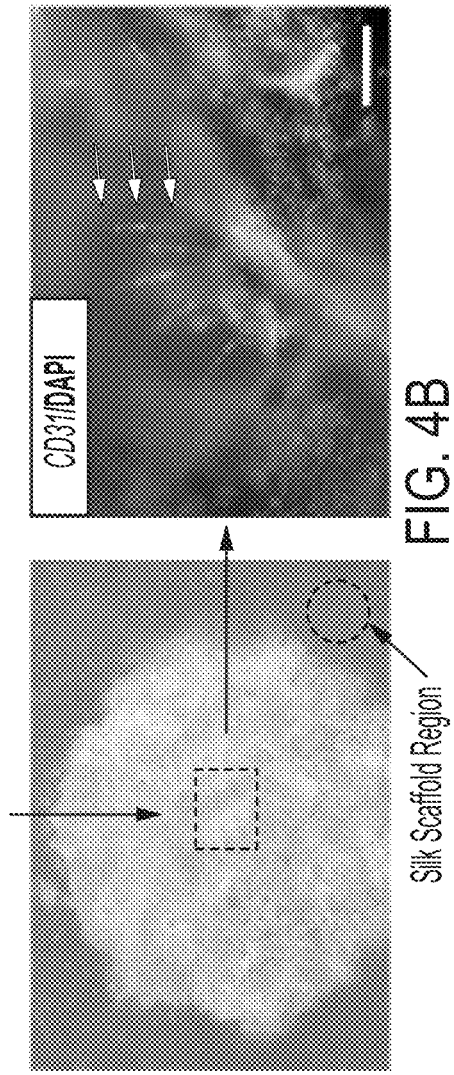

FIG. 4 shows that 3D tumor models demonstrated tumor-specific phenotypic features, as tumor spheroids anchored within the 3D scaffold (FIG. 4A) and ependymoma-associated endothelial capillary formation (FIG. 4B).

Figure 5:
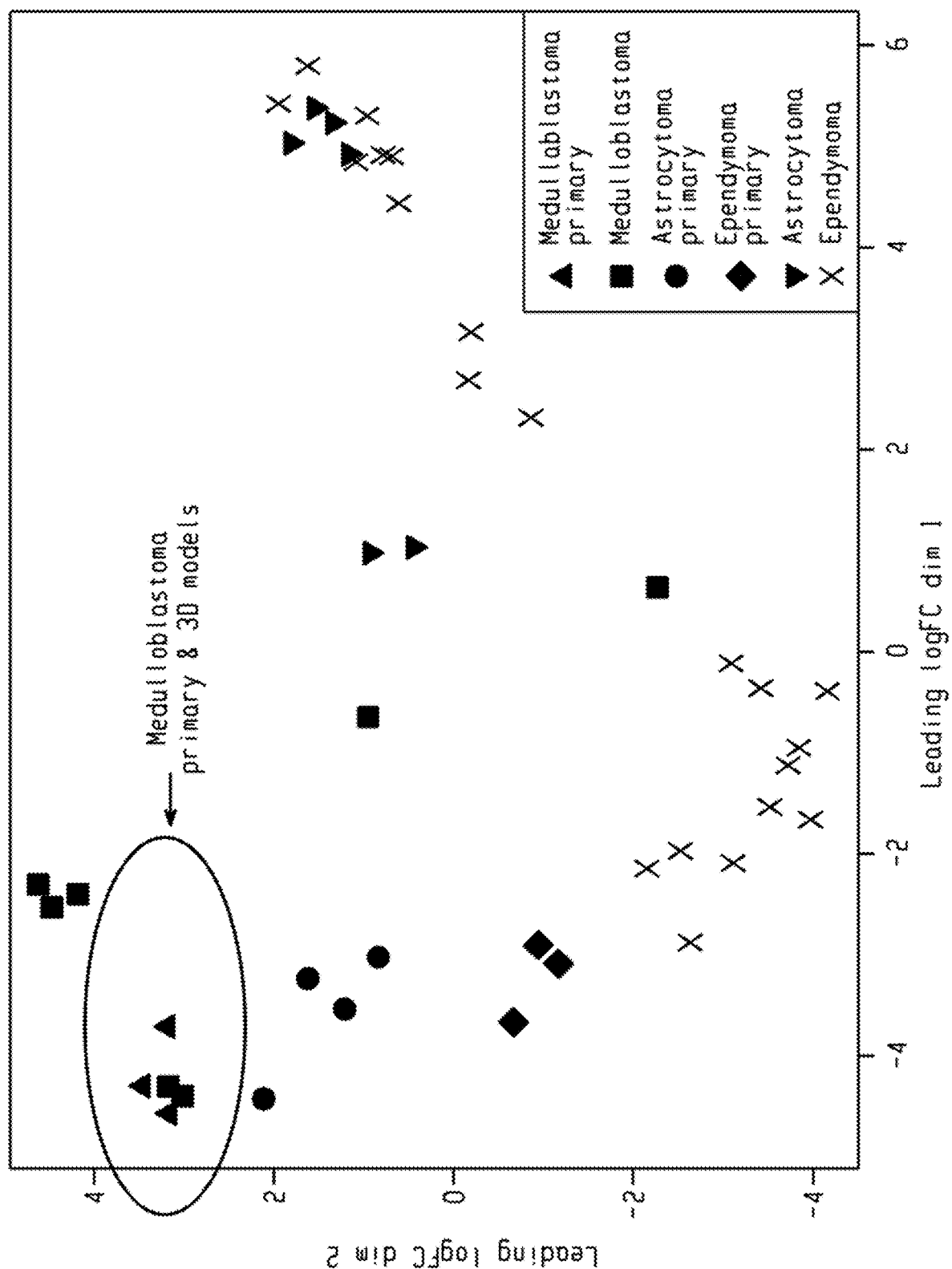
FIG. 5 shows multi-dimensional scaling plot of RNA-seq. data from 3D models and primary tumor tissue.
Figure 6:
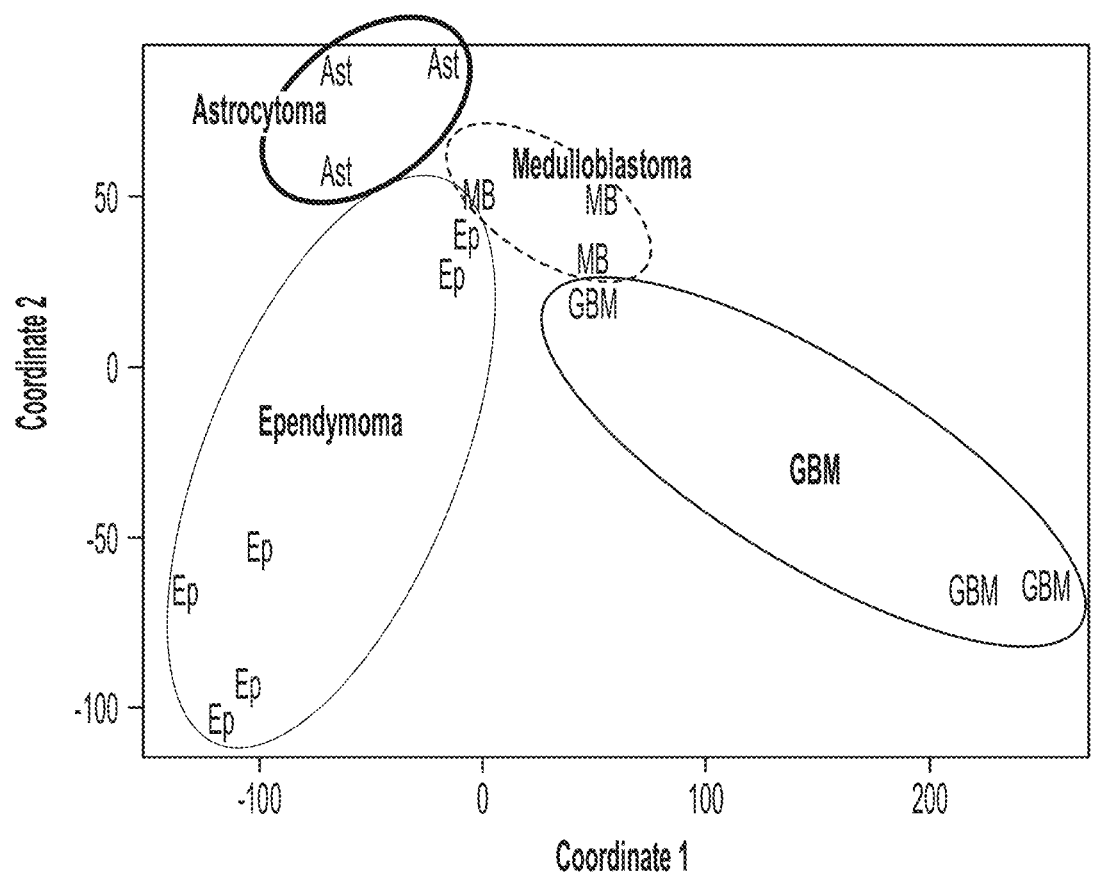
FIG. 6 shows multi-dimensional scaling plot of mass spectrometry data from the culture supernatants of 3D tumor models. Note the clustering by tumor types (circle).

FIG. 5 shows the multi-dimensional scaling plot of RNA-seq data of 3D models and primary tumor tissues. The distance between samples on the plot is proportional to the mean fold change of gene expression differences between samples. The result demonstrates that some 3D models (e.g., medulloblastoma) exhibited nearly indistinguishable transcriptome profiles from patient-matched primary tumor, with less than 2% gene expression differences (circle). The number of differentially expressed genes identified in each of the comparisons between in vitro vs. primary tissues, are 402 (1.5%) of medulloblastoma, 3,515 (12.8%) of ependymoma and 4,562 (16.6%) of astrocytoma, out of total 27,465 protein coding genes and lincRNAs. Similarly, the multi-dimensional scaling plot of mass spectrometry data from the culture supernatants of 3D models also shows that the release profiles are largely clustered according to tumor types (FIG. 6).

Figure 7A:
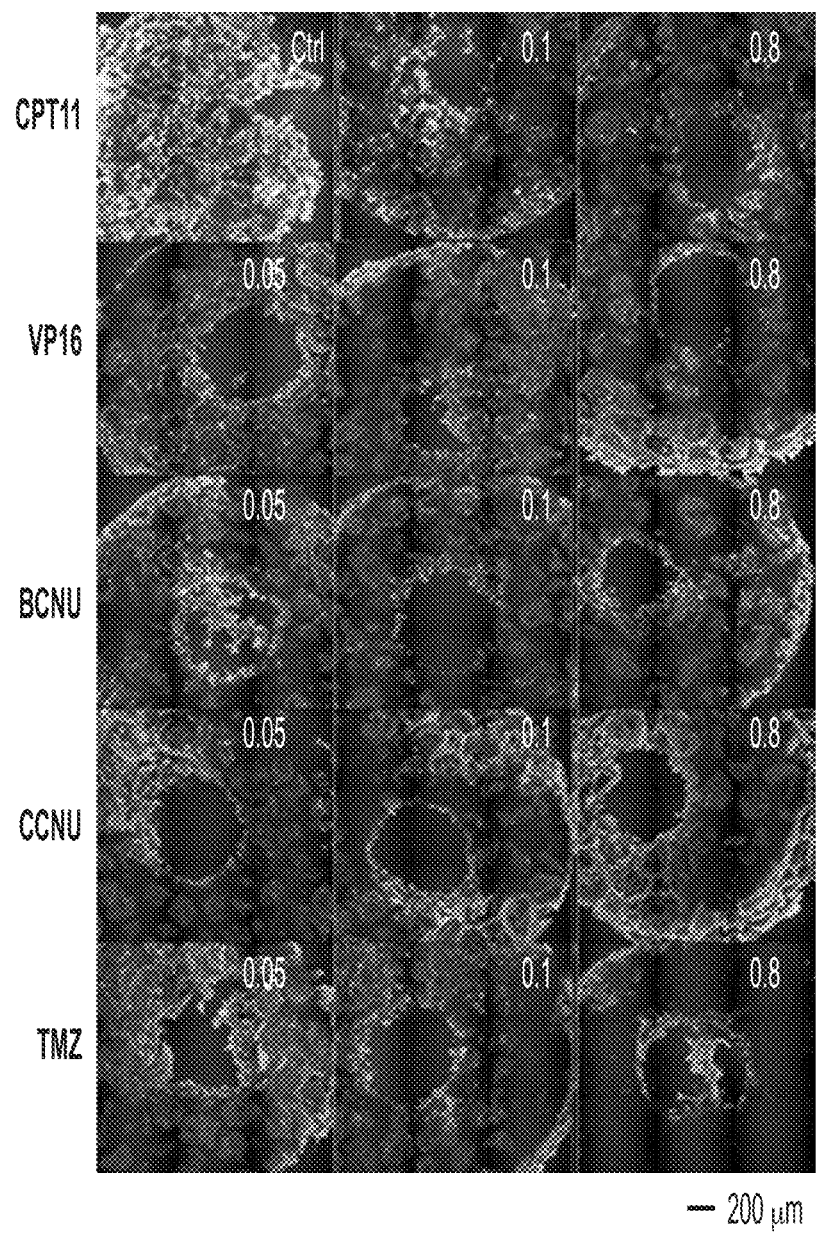
FIGS. 7A-7B show drug treatment of 3D patient-derived meningioma models. A pediatric patient's meningioma tissue was used to generate replicates of 3D tumor models. One month-old models were treated with chemotherapeutic drugs, etoposide (VP16), carmustine (BCNU), lomustine (CCNU), irinotecan hydrochloride (CPT11) and temozolomide (TMZ) of 0.05 to 0.8 mM for 48 hours. The models were stained with calcein AM (2 uM) for live cells and confocal imaged (30 mm section, 35 sections).
Figure 7B:
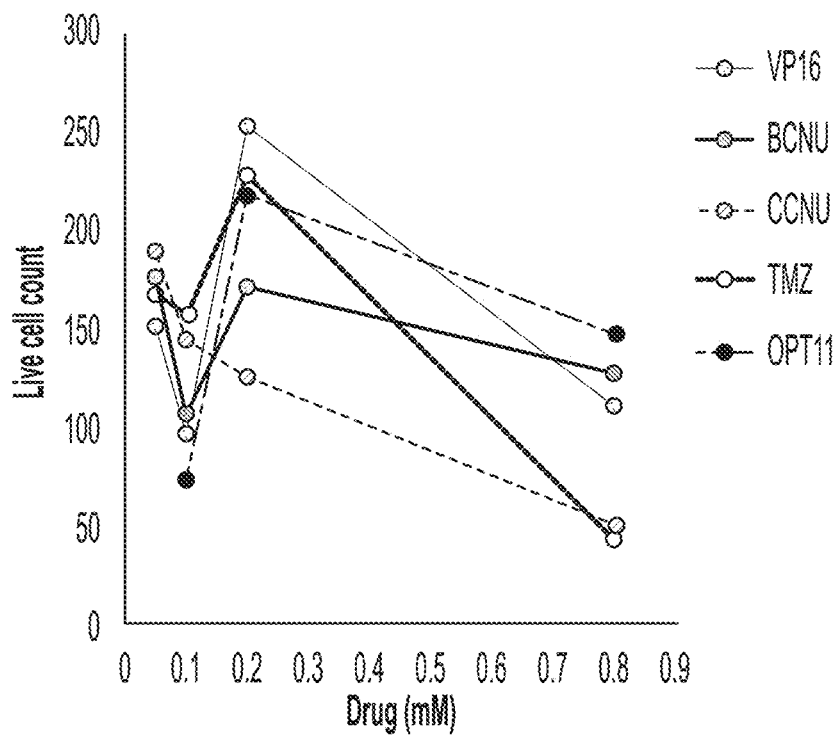

FIGS. 7A-7B show an example of drug study using patient-derived tumor models. This example used a pediatric meningioma model to test commonly used chemotherapeutic drugs (etoposide, carmustine, lomustine, irinotecan hydrochloride and temozolomide). The case study showed varying degrees of drug sensitivity of the tumor tissue and suggested lomustine with the strongest tumor cell-killing effects compared to other drugs. Additional studies will compare the in vitro findings with the patient's clinical responses to further determine the most optimal drug regimen.

Together, these data show that the 3D tumor models can realize tumor type-specific molecular characteristics.

Patient Brain Tumor Tissue

Human patient brain tissue was obtained from tumor resection neurosurgery in Connecticut Children's Medical Center (CCMC) at Hartford, Connecticut. The procedures were approved by the Institutional Research Boards of UConn Health Center and CCMC (IRB #15-033). Informed consent was obtained from all human patients prior to the surgery. All methods were performed in accordance with the guidelines and regulations by the approved IRB protocol. Tissue specimen was transported in chilled RPMI-1640 medium (Sigma-Aldrich, St Louis, MO, USA) containing 1% penicillin-streptomycin (Pen/Strep, Thermo Fisher, Waltham, MA, USA) on ice pack from the operation room to the laboratory in <4-hour post-surgery.

Brain Tumor Tissue Dissociation

The tissue specimen was weighed, cut into ~1 mm$^3$ pieces with a sterile razor blade, re-suspended at 1,600 mg tissue/10 mL in Hibernate-A medium[55] (Thermo Fisher) containing 1% Pen/Strep and primocin (10 µg/mL, InvivoGen, San Diego, CA, USA). The tissue suspension was manually dissociated by gentle pipetting, filtered with 100-µm cell strainer (Fisher Scientific, Suwannee, GA, USA) and single cell suspension was collected. Approximate 30,000-100,000 cells/mg tissue were obtained.

Endothelial Cells:

Human cerebral microvascular endothelial cell line hMEC/D3 (Millipore, Burlington, MA, USA) was used for co-culture studies.

3D Silk Protein-based Scaffolds and Extracellular Matrix (ECM) Gel Infusion

Silk solution and porous scaffolds were prepared from Bombyx mori cocoons as described previously[14, 17]. Salt-leached porous silk mats of 100 mm dia. were provided by David Kaplan's laboratory at Tufts University. A biopsy punch was used to generate donut-shaped silk protein-based scaffold (outer dia., 5 mm; inner dia., 2 mm; height, 2 mm). Silk scaffolds were autoclaved, coated with poly-D-lysine (10 µg/mL, Sigma) overnight, and washed 3 times with phosphate buffered saline (PBS, Sigma). Collagen gel was prepared from high-concentration rat tail type I collagen (8-10 mg/ml, Fisher Scientific), 10X M199 medium (Thermo Fisher) and 1 M sodium hydroxide mixed at a ratio of 88:10:2, followed by gelling at 37° C. for 1-2 hrs. Matrigel (~10 mg/mL, growth factor reduced, Fisher Scientific) was mixed at 1:1 ratio with collagen gel before infusing the silk scaffolds. To make a scaffold-gel composite structure, the cell-seeded scaffolds were transferred to a new dish, dabbed on the dry surface for a few times to deplete free-flowing liquid and then infused with the liquid ECM gel. The scaffold/gel composite was incubated at 37° C. for 1 hour for the gel to solidify before culture medium immersion.

Cell Plating

For 2D cultures, cells were plated at 105,263 cells/cm$^2$ in 6-well plate (corresponding to 1 million cells/well). One plate per time-point was used, totaling 14 plates. For 3D scaffold-based cultures, the scaffolds were immersed in high-density cell suspensions (~100 million cells/mL) for 24 hours followed by extensive washes with media, and proceed to scaffold-only cultures or ECM gel-infused composite cultures. Culture media used include: NeuralBasal\B27 (Invitrogen, Grand Island, NY, USA) supplemented with 20 ng/mL recombinant human fibroblast growth factor, basic-154 (FGF, ConnStem, Cheshire, CT, USA) and 20 ng/mL human epidermal growth factor (EGF, PeproTech, Rocky Hill, NJ, USA), termed "N" medium; NeuralBasal\B27\EGF\FGF supplemented with 10% fetal bovine serum (FBS, Denville Scientific, Metuchen, NJ, USA) ("N+FBS"), and "N" medium mixed at 1:1 with endothelial growth media EGM-2MV (Lonza, Walkersville, MD, USA) without serum ("NE"). Media were changed once a week for all culture systems.

3D Tumor-Endothelial Co-culture

A pre-engineered micro-conduit was used to direct flow and provides a structure for initiating tumor angiogenesis. Briefly, a micro-needle (150 μm dia., 5 mm length) was inserted horizontally prior to addition of aqueous ECM gel into the center hole region of the donut-shaped 3D model. After the gel solidified, the micro-needle was removed. Endothelial cells (20,000 cells/vessel) was perfused into the micro-vessel for attachment and coverage of the vessel wall, and excess cells removed by perfusion.

Tissue Viability Assay

AlamarBlue assay was used to measure cell viability of 3D cultures, according to the manufacturer's protocol (ThermoFisher Scientific). Briefly, alamarBlue reagent was mixed in fresh culture media (1:10, v/v) and incubated for 2 hrs at 37° C. The solution was transferred into a new 96-well plate. The fluorescence intensity was read at Ex./Em. of 560/590 nm on a micro-plate spectrophotometer (Synergy 2, BioTek, Winooski, VT, USA). Four replicate cultures per condition were used for this assay, and the readings were normalized against media controls.

Live/Dead Assay

Live/Dead Assay was used to image live cells in cultures, according to the manufacturer's protocol (ThermoFisher Scientific). Briefly, cultures were washed once with PBS, incubated with fresh medium containing calcein-AM (Live stain, 2 μg/mL) and ethidium homodimer-1 (Dead stain, 1 μg/mL) at 37° C. for 20 min, washed with PBS once, and returned to fresh medium for another 20 min at 37° C. The stained cultures were imaged with a fluorescence microscope at Ex/Em of 494/517 nm and 528/617 nm for Live and Dead stains, respectively.

Immunofluorescence Staining and Imaging

Cell cultures were fixed with 4% paraformaldehyde (Electron Microscopy Sciences) for 20 min, washed, permeabilized with PBS containing 0.1% Triton X-100 (Fisher Scientific) and 4% normal goat serum (Jackson ImmunoResearch Labs, West Grove, PA, USA) for 20 min, followed with incubation of primary antibodies overnight at 4° C. After three 10 min PBS washes, cells were incubated with secondary antibodies for 1 hr at room temperature, followed by extensive washes. Antibodies included: anti-βIII-tubulin (TUJ1, mouse clone 2G10, 1:500, eBioscience; rabbit, Sigma), anti-glial fibrillary acidic protein (GFAP, mouse clone GA5, 1:500, eBioscience; rabbit, Thermo Fisher), anti-Nestin (mouse clone 10C2, 1:100, eBioscience), anti-Ki67 (mouse clone B56, 1:100, BD Biosciences), anti-Vimentin (mouse clone RV202, 1:200, BD Bioscience), anti-alpha smooth muscle actin (SmA, rabbit clone E184, 1:100, Abcam, Cambridge, MA USA), anti-microtubule associated protein-2 (MAP2, mouse clone M13, 1:200, Life Technologies, Grand Island, NY, USA), anti-neural/glial antigen 2 (NG2, mouse clone 9.2.27, 1:100, eBioscience), anti-platelet-derived growth factor receptor beta (PDGF-RB, rabbit, 1:50, Thermo Fisher). Goat anti-mouse or rabbit Alexa 488 and 546 (1:250; Invitrogen) secondary antibodies were used. Fluorescence images were acquired on a Leica DM IL fluorescence microscope using excitation/emission (Ex/Em) of 470/525 nm for Alexa 488, and Ex/Em of 560/645 nm for Alexa 568. Confocal images were acquired on a Zeiss 780 laser scanning confocal imaging system.

Immunohistology 3D cultures were fixed in 4% paraformaldehyde, washed, stored in 70% ethanol, and processed in Shandon Pathcentre (Thermo Fisher), and paraffin-embedded in HistoCentre 2 (GMI, Ramsey, MN USA). Five μm sections were cut with a microtome (Olympus CUT 4055), and mounted onto poly-1-lysine (Sigma) coated glass slides. Some sections were proceeded to standard hematoxylin & eosin (H&E) staining. For antibody staining, sections were antigen-retrieved by immersing in a citric buffer (Thermo Fisher) inside a steamer at 95° C. for 20 min. Slides were incubated with primary antibody solution at 4° C. overnight, followed by three 5 min PBS washes, blocked by hydrogen peroxide (3%, Thermo Fisher) for 10 min at room temperature (RT), and washed 3× with PBS. Slides were stained with anti-mouse secondary antibodies with the ImmPress Reagent kit (Vector Laboratories, Burlingame, CA USA) for 1 hr at RT, washed, and treated with the DAB peroxidase substrate kit (Vector) for 3-5 min and inspected under a microscope. After extensive washes, slides were counter-stained with hematoxylin for ~10 s, dehydrated, cleared, and mounted.

Protein Mass Spectrometry

Soluble factors were collected from culture supernatant. Approximately 250 μg of total protein was reserved for mass spectrometry. For mass spectrometry, all protein samples were processed using published Filter-Aided Sample Preparation (FASP) methods[3], resulting in desalted tryptic peptides amenable to LCMS analysis using a Thermo Ultimate 3000 RSLC coupled directly to a Thermo Q Exactive HF mass spectrometer. Mass spectra were interpreted with Spectrum Mill (Agilent). High-resolution MS/MS spectra were searched against the most recent UniProt proteome databases using the MaxQuant search algorithm[4] and/or Proteome Discoverer. Peptides identified (FD rate estimate of <5%) were assembled into identified proteins and annotated.

RNA-Seq and Transcriptomic Profiling

RNAs were exacted with Qiagene AllPrep kit on a Qia-Cube automated station. Samples were sequenced by JAX-GM Genome Technologies Core. RNA-seq libraries were prepared with KAPA Stranded mRNA-Seq kit. Quantification of libraries were performed using real-time qPCR. Sequencing was performed on Illumina Hiseq 4000 platform generating paired end reads of 75 bp. Raw reads from sequencing were processed including quality control steps to identify and remove low quality samples. Bowtie 2 was used for read alignment, and RSEM method was used for expression estimation[5,6]. The expected counts data were normalized using the TMM normalization method[7] and the similarities in expression profiles visualized using the multi-dimensional scaling plot method available in R-package limma[8].

Drug Treatment

Standard-care chemotherapeutics for brain tumor includes temozolomide, vinblastine, vincristine/carboplatin, thioguanine/procarbazine/lomustine/vincristine depending on tumor type and grade[9]. Other drugs to be tested include, but are not limited to, MK-2206 (Akt inhibitor), AZD6244 (MEK inhibitor), valproic acid (histone deactylase inhibitor), GDC-0449 (SSH pathway inhibitor)[10]. Drug treatment groups include sham control group and different drugs with a dosage range of 0.1-100 μM. 3D tumor models were transferred into 96-well plates in serum-free base medium and grouped according to treatments (dose duration, 72 hr, 5 days, 2-4 weeks) with triplicates per condition. A high-content image-based screening platform (PerkinElmer Symphony, JAX-GM) was used for Live/Dead assay and tumor spheroid morphology analysis.

Statistical Analysis

Data are mean±standard error of mean (S.E.M.), except where otherwise noted. Analysis used Student's t-test, except cell percentage data. For all tests, p<0.05 was considered significant. For statistical analysis of flow cytometry-measured cell percentages, construction of simultaneous confidence intervals was performed, as we previously described. A program wrote in R was used to implement the analysis.

REFERENCES

1. Tang-Schomer, M. D., White, J. D., Tien, L. W., Schmitt, L. I., Valentin, T. M., Graziano, D. J., Hopkins, A. M., Omenetto, F. G., Haydon, P. G. and Kaplan, D. L. Bioengineered functional brain-like cortical tissue. *Proc. Natl. Acad. Sci. U.S.A.,* 2014 Vol. 111. Issu. 38. pg 13811-613811-13816. DOI10.1073/pnas.1324214111 [doi]. PM1D25114234. PMC4183301.
2. Tang-Schomer, M. D., Wu, W. B., Kaplan, D. L. and Bookland, M. J. In Vitro 3D Regeneration-like Growth of Human Patient Brain Tissue. *J. Tissue Eng. Regen. Med.,* 2018 DOI10.1002/term.2657 [doi]. PMID29509306.
3. Wisniewski, J. R., Zougman, A., Nagaraj, N. and Mann, M. Universal sample preparation method for proteome analysis. *Nat. Methods,* 2009 Vol. 6. Issu. 5. pg 359-62359-362. DOI10.1038/nmeth.1322 [doi]. PMID19377485.
4. Cox, J. and Mann, M. MaxQuant enables high peptide identification rates, individualized p.p.b.-range mass accuracies and proteome-wide protein quantification. *Nat. Biotechnol.,* 2008 Vol. 26. Issu. 12. pg 1367-721367-1372. DOI10.1038/nbt.1511 [doi]. PM1D19029910.
5. Li, B. and Dewey, C. N. RSEM: accurate transcript quantification from RNA-Seq data with or without a reference genome. *BMC Bioinformatics,* 2011 Vol. 12. pg 323, 2105-12-323323-2105-12-323. DOI10.1186/1471-2105-12-323 [doi]. PM1D21816040. PMC3163565.
6. Langmead, S. 2012 AHCA/NCAL National Quality Award: commitment, achievement, excellence. *Provider,* 2012 Vol. 38. Issu. 10. pg 40, 2, 44, 47-840-2, 44, 47-8. PMID23072206.
7. Robinson, M. D., McCarthy, D. J. and Smyth, G. K. edgeR: a Bioconductor package for differential expression analysis of digital gene expression data. *Bioinformatics,* 2010 Vol. 26. Issu. 1. pg 139-40139-140. DOI10.1093/bioinformatics/btp616 [doi]. PMID19910308. PMC2796818.
8. Ritchie, M. E., Phipson, B., Wu, D., Hu, Y., Law, C. W., Shi, W. and Smyth, G. K. limma powers differential expression analyses for RNA-sequencing and microarray studies. *Nucleic Acids Res.,* 2015 Vol. 43. Issu. 7. pg e47e47. DOI10.1093/nar/gkv007 [doi]. PMID25605792. PMC4402510.
9. Kilday, John-Paul and Bouffet, Eric. Chemotherapy in Childhood Brain Tumors. 2014 Vol. 2. Issu. 1. pg 4949.
10. Nageswara Rao, A. A., Scafidi, J., Wells, E. M. and Packer, R. J. Biologically targeted therapeutics in pediatric brain tumors. *Pediatr. Neurol.,* 2012 Vol. 46. Issu. 4. pg 203-11203-211. DOI10.1016/j.pediatrneurol.2012.02.005 [doi]. PMID22490764. PMC3654250.

All references, patents and patent applications disclosed herein are incorporated by reference with respect to the subject matter for which each is cited, which in some cases may encompass the entirety of the document.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The terms "about" and "substantially" preceding a numerical value mean±10% of the recited numerical value.

Where a range of values is provided, each value between the upper and lower ends of the range are specifically contemplated and described herein.

What is claimed is:

1. A personalized in vitro brain tumor model comprising a culture medium and patient tumor cells, wherein a brain tumor tissue sample is extracted directly from the patient, dissociated, and the patient tumor cells from the brain tumor tissue sample seeded directly onto a three-dimensional solid scaffold in the absence of extracellular matrix or endothelial cells to provide tumor growth on the scaffold,
    wherein the three-dimensional solid scaffold comprises a biocompatible and/or biodegradable material, wherein the three-dimensional solid scaffold and directly seeded patient tumor cells are optionally coated with extracellular matrix and/or endothelial cells.

2. The in vitro brain tumor model of claim 1, wherein the brain tumor model comprises brain tumor tissue as multicellular spheroids.

3. The in vitro brain tumor model of claim 1, wherein the patient is a pediatric patient.

4. The in vitro brain tumor model of claim 1, wherein the brain tumor sample is from a brain tissue selected from the group consisting of: white matter, gray matter, cerebrospinal fluid (CSF), medulla oblongata, pons, ventricles, cerebellum, tectum, pretectum, tegmentum, cerebral peduncle, cranial nerve nuclei, epithalamus, thalamus, hypothalamus, subthalamus, pituitary gland, rhinencephalon, and cerebral cortex tissue.

5. The in vitro brain tumor model of claim 1, wherein the brain tumor sample is from a tumor selected from the group consisting of: neuromas, astrocytomas, chrodomas, central nervous system (CNS) lymphomas, craniopharyngiomas, brain stem gliomas, ependymomas, mixed gliomas, optic nerve gliomas, subependymomas, medulloblastomas, meningiomas, metastatic brain tumors, oligodendrogliomas, pituitary tumors, primitive neuroectodermals, schwannomas, pineal tumors, rhabdoid tumors, and Juvenile Pilocytic Astrocytomas (JPAs).

6. The in vitro brain tumor model of claim 1, wherein the biocompatible and/or biodegradable material is *Bombyx mori* silk protein.

7. The in vitro brain tumor model of claim 1, wherein the extracellular matrix comprises poly-lysine, collagen, a gelatinous protein mixture secreted by Engelbreth-Holm-Swarm (EHS) mouse sarcoma cells, or a combination thereof.

8. The in vitro brain tumor model of claim 1, wherein the extracellular matrix comprises a 1:1 ratio of collagen to a gelatinous protein mixture secreted by EHS mouse sarcoma cells.

9. The in vitro brain tumor model of claim 1, wherein the culture media comprises a reagent selected from the group consisting of neural basal media optionally supplemented with B-27, recombinant human fibroblast growth factor, recombinant human epidermal growth factor; and microvascular endothelial cell growth media.

10. A collection of in vitro brain tumor models of claim 1, wherein each in vitro brain tumor model comprises a brain tumor sample from a different patient.

11. The in vitro brain tumor model of claim 1, wherein the brain tumor cells are from a brain cancer selected from acoustic neuroma, astrocytoma, chrodoma, central nervous system (CNS) lymphoma, craniopharyngioma, brain stem glioma, ependymoma, mixed glioma, optic nerve glioma, subependymoma, medulloblastoma, meningioma, metastatic brain tumors, oligodendroglioma, pituitary tumors, primitive neuroectodermal, schwannoma, pineal tumor, rhabdoid tumor, and Juvenile Pilocytic Astrocytoma (JPA).

12. The in vitro brain tumor model of claim 1, wherein the brain tumor sample experiences growth in the in vitro brain tumor model.

13. The in vitro brain tumor model of claim 1, wherein the biocompatible and/or biodegradable material comprises a protein.

14. The in vitro brain tumor model of claim 1, wherein the culture media is supplemented with tumor-secreted factors.

* * * * *